(12) United States Patent
Lukso et al.

(10) Patent No.: US 9,088,054 B2
(45) Date of Patent: Jul. 21, 2015

(54) SENSOR SYSTEM AND METHOD TO PREVENT BATTERY FLAMING IN OVERCHARGE

(75) Inventors: Richard Lukso, Tucson, AZ (US); Sandip Uprety, Tucson, AZ (US)

(73) Assignee: Panacis Inc., Ottawa, ON (CA)

( * ) Notice: Subject to any disclaimer, the term of this patent is extended or adjusted under 35 U.S.C. 154(b) by 479 days.

(21) Appl. No.: 13/390,920

(22) PCT Filed: Sep. 1, 2010

(86) PCT No.: PCT/IB2010/053912
§ 371 (c)(1),
(2), (4) Date: Mar. 20, 2012

(87) PCT Pub. No.: WO2011/030254
PCT Pub. Date: Mar. 17, 2011

(65) Prior Publication Data
US 2012/0169296 A1    Jul. 5, 2012

Related U.S. Application Data

(60) Provisional application No. 61/240,938, filed on Sep. 9, 2009.

(51) Int. Cl.
H01M 10/46    (2006.01)
H01M 10/44    (2006.01)
H01M 10/48    (2006.01)
H01M 10/52    (2006.01)

(52) U.S. Cl.
CPC .......... *H01M 10/443* (2013.01); *H01M 10/441* (2013.01); *H01M 10/482* (2013.01); *H01M 10/52* (2013.01)

(58) Field of Classification Search
USPC ................................. 320/107, 147, 150, 153
See application file for complete search history.

(56) References Cited

U.S. PATENT DOCUMENTS 4,247,811 A * 1/1981 Findl .............................. 320/134
6,469,511 B1 * 10/2002 Vonderhaar et al. .......... 324/425

* cited by examiner

*Primary Examiner* — Edward Tso
(74) *Attorney, Agent, or Firm* — MU Patents; Timothy Marc Shropshire

(57) ABSTRACT

A sensor system for mitigating a flame condition in a battery subject to an overcharge condition and being charged using a charging current is provided. A temperature sensor is configured to detect a temperature of at least one component of the battery, and a gas sensor is configured to detect an inflammable gas or vapor. A sensor control is configured to, when the temperature of the at least one component of the battery exceeds a pre-determined temperature threshold and when the gas sensor detects an inflammable gas or vapor, halt the charging current.

14 Claims, 5 Drawing Sheets

SENSOR SYSTEM AND METHOD TO PREVENT BATTERY FLAMING IN OVERCHARGE

CROSS-REFERENCE TO RELATED APPLICATIONS

The present application claims priority to International Application No. PCT/IB2010/053912 filed on Sep. 1, 2010, entitled "Sensor System and Method to Prevent Battery Flaming in Overcharge", which claims benefit of U.S. Provisional Patent Application No. 61/240,938 filed on Sep. 9, 2009, the entire disclosures of which are incorporated by reference herein.

TECHNICAL FIELD

Various implementations of the present invention, and combinations thereof, are related to sensors and, more particularly, to a sensor system and method for preventing battery flaming in overcharge by detecting an organic vapor or gas vented by a battery or cell and an elevated temperature of the battery or cell.

BACKGROUND ART

A battery is an electronic component that stores electrical energy. Many batteries operate by storing electrical energy in the form of chemical energy using several voltaic cells connected in series by a conductive electrolyte. One half-cell includes an anode and the other half-cell includes a cathode. As the battery operates, a reduction-oxidation (redox) process occurs, causing cations to be reduced at the cathode, while anions are oxidized (removal of electrons) at the anode. During the redox process an electrical potential is created across the terminals of the battery.

Some batteries are configured to be re-charged. During the re-charging process, an electrical potential is applied across the terminals of the battery and the redox process described above is reversed—active material within the battery is oxidized, producing electrons, while the negative material in the battery is reduced, consuming electrons. After charging the battery, a load can be connected across the battery terminals, the original redox process occurs and the load is powered by the chemical energy stored within the battery.

In some cases, batteries can become overcharged resulting in a potentially hazardous condition. For example, in some batteries or cells, overcharge may cause the battery to vent hydrogen (generated by electrolysis of the water in the electrolyte)—a potentially explosive gas. In one specific example, when a lithium polymer cell is overcharged, the internal electrolyte overheats causing pressure to build inside the battery cell. As the battery is overcharged, the temperature and pressure continues to increase until the soft aluminum outer casing perforates causing potentially explosive internal solvent gasses to be vented. If the overcharge is allowed to continue, the solvent gas may ignite, resulting in a significant fire flash lasting approximately one minute. In some cases, however, if the overcharge is discontinued at the point of perforation (venting) there may be no fire event.

There exists a need for a system that does not rely solely on the temperature of a battery to determine if flame retardents should be used on the battery. There further exists a need to remove the source of the temperature rise which is most commonly an overcharge situation.

DISCLOSURE OF INVENTION

In one embodiment, a sensor system for mitigating a flame condition in a battery subject to an overcharge condition and being charged using a charging current includes a temperature sensor configured to detect a temperature of at least one component of the battery, and a gas sensor configured to detect an inflammable gas or vapor. The sensor system includes a sensor control. The sensor control is configured to, when the temperature of the at least one component of the battery exceeds a pre-determined temperature threshold and when the gas sensor detects an inflammable gas or vapor, halt the charging current.

In another embodiment, a method for mitigating a flame condition in a battery subject to an overcharge condition and being charged using a charging current includes detecting a temperature of at least one component of the battery, and detecting an inflammable gas or vapor. When the temperature of the at least one component of the battery exceeds a pre-determined temperature threshold and an inflammable gas or vapor is detected, the method includes halting the charging current.

Implementations will become more apparent from the detailed description set forth below when taken in conjunction with the drawings, in which like elements bear like reference numerals.

Advantageous Effects

BEST MODE

Figure 1:
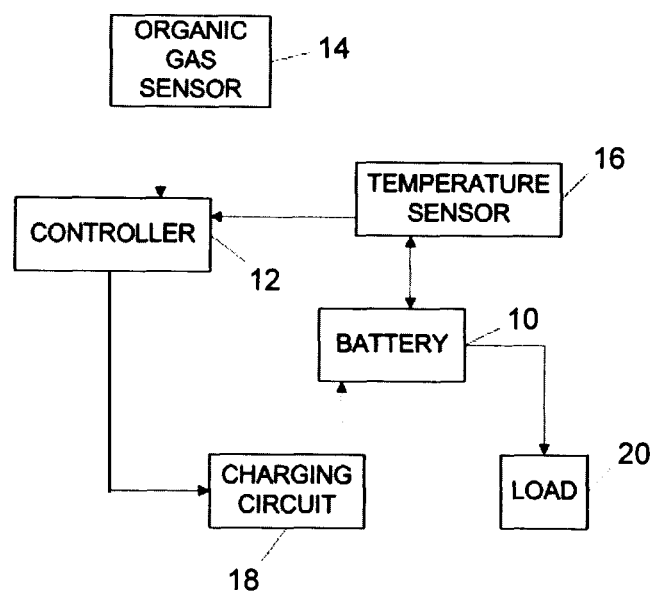
FIG. 1 is an illustration showing an example implementation of the present sensor system to mitigate risk of battery overcharging.

The present invention is described in preferred embodiments in the following description with reference to the Figures, in which like numbers represent the same or similar elements. Reference throughout this specification to 'one embodiment,' 'an embodiment,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

When a lithium polymer or lithium ion cell is overcharged, the internal electrolyte overheats causing pressure to build inside the battery cell. As the battery cell is overcharged, the temperature and pressure continue to increase until the soft aluminum outer casing perforates (for a lithium polymer battery cell) or the over-pressure valve vents or exhausts (for a lithium ion cylindrical cell) causing potentially explosive internal solvent gasses or vapors to be vented. If the overcharge is allowed to continue, the solvent gas or vapor may ignite, resulting in a significant fire flash lasting approximately one minute. In some cases, however, if the overcharge is discontinued at the point of perforation (venting) there may be no fire event.

Sometimes overcharging results from a failure in the electronic circuitry connected to a battery to correctly implement the re-charging process. For example, if the circuit does not detect that the battery is already fully charged, or, if the battery is incapable of receiving a full charge, the charging process may continue for too long, resulting in an overcharge condition.

The present system uses an organic gas sensor to detect the inflammable gasses or vapors that may be vented by a battery in an overcharge condition. After the gasses are detected, indicating that the battery casing has perforated or an over-pressure exhaust valve has vented and a potential flame condition exists, the overcharging process may be shutdown to minimize the potential fire hazard resulting from the vented gasses.

As such, the present sensor system may be configured to include both an organic gas sensor for detecting inflammable gasses vented by a battery subject to an overcharge condition, and a temperature sensor to simultaneously detect an elevated unsafe temperature of a battery or cell (also indicating an overcharge condition). In this logical 'anded' configuration, the present system triggers a shutdown of the battery charging processes if an inflammable gas is detected and one or more components of the battery is operating at a temperature above normal operating temperature.

The system may also include a delay circuit to delay sensor readings following sensor system start-up. In one implementation, the gas sensor includes a small heater device that must reach operating temperature before the gas sensor operates correctly. Before the heater is fully operational, the gas sensor may incorrectly detect inflammable gasses. In the present implementation, the gas sensor start-up time is approximately 18 seconds, however other gas sensors may have different start-up times requiring delay circuitry having different delay durations, such as any time period greater than 15 seconds.

FIG. 1 is an illustration showing an example implementation of the present sensor system to mitigate risk of battery overcharging and the resulting fire condition. Battery 10 may include any electrical component configured to discharge energy through a load 20 and store a charge received from charging circuit 18.

As the battery is charged, organic sensor 14 monitors an airspace close to battery 10 to detect any venting of inflammable gasses from battery 10. Temperature sensor 16 monitors a temperature of battery 10, for example by monitoring a temperature of one or more cells of battery 10. If the temperature of battery 10 passes a pre-defined threshold, that condition may indicate that battery 10 is entering an overcharge condition.

Sensor controller 12 receives input signals from organic sensor 14 and temperature sensor 16. If both sensors supply a positive signal, indicating that organic sensor 14 has detected an inflammable gas and temperature sensor 16 detects that a portion of battery 10 has a temperature exceeding the pre-determined threshold, sensor controller 12 may transmit a signal to charging system 18 causing charging system 18 to halt charging battery 10 to prevent a possible flame condition.

In one implementation, sensor controller 12 may be further configured to implement a delay to minimize the likelihood of false alarms generated during the start-up process of the sensor system.

Figure 2:
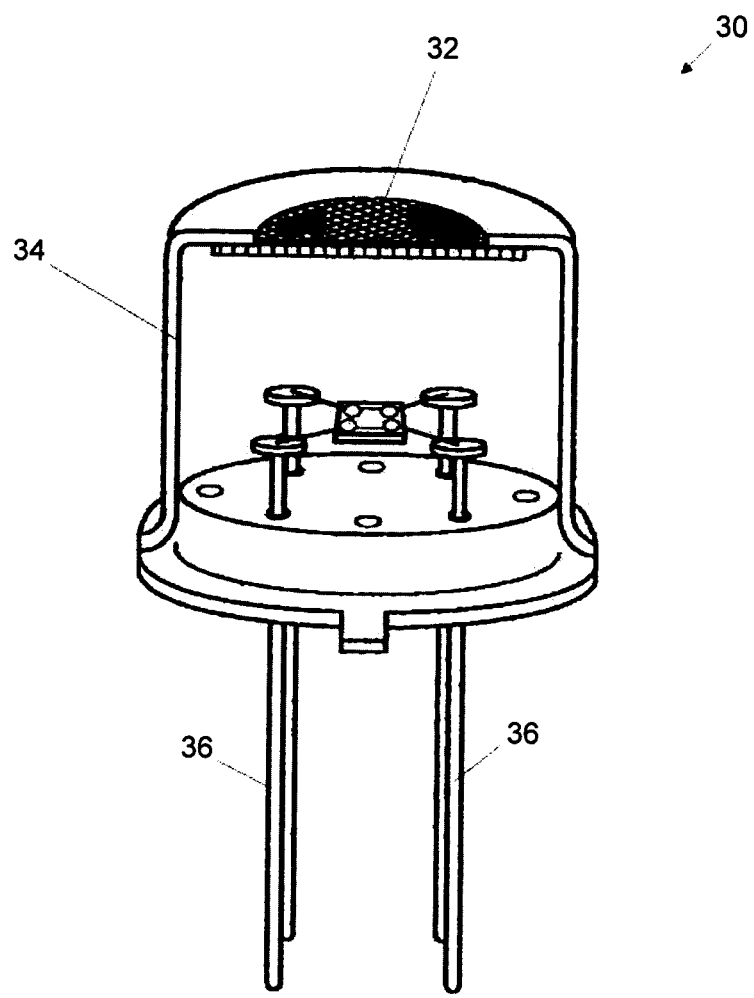
FIG. 2 is an illustration of an organic sensor that may be integrated into the present system to detect inflammable gasses vented from a battery experiencing overcharge.

FIG. 2 is an illustration of an organic sensor that may be integrated into the present system to detect inflammable gasses or vapors vented from a battery experiencing overcharge. Organic sensor 30 is configured to detect volatile organic vapors. In one implementation, organic sensor 30 includes a TGS2620 sensor manufactured by FIGARO. Organic sensor 30 may include a screen-printed thick film metal-oxide semiconductor sensor providing high selectivity to volatile organic vapors such as ethanol, methanol, etc.

Organic sensor 30 includes a stainless steel gauze covering 32. Metal cap 34 provides physical protection and support to organic sensor 30. Various lead pins 36 are provided for retrieving the electronic sensor signal generated by organic sensor 30 and supplying energy to a heater system disposed within the gas sensor.

Figure 3A:
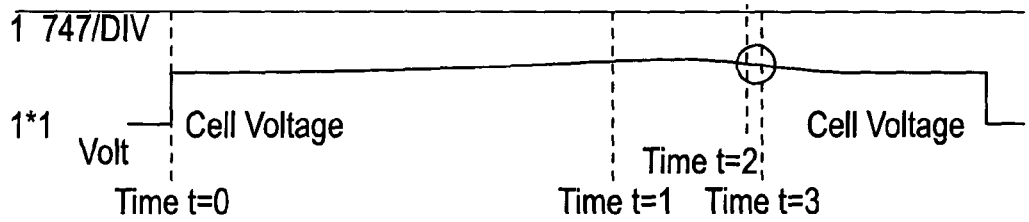
FIGS. 3a-3d are a series of graphs showing measured data from one example implementation of the present sensor system.
Figure 3B:
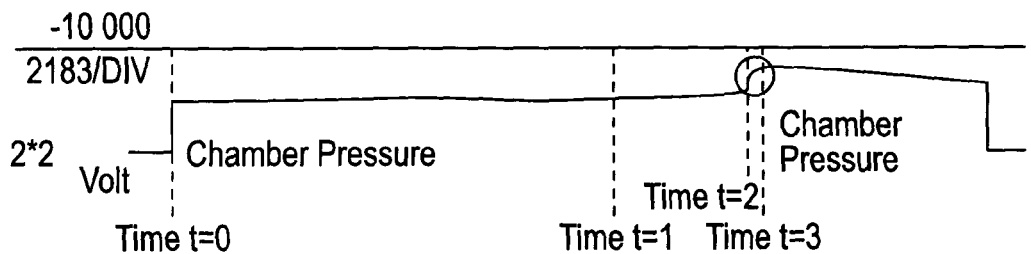
Figure 3C:
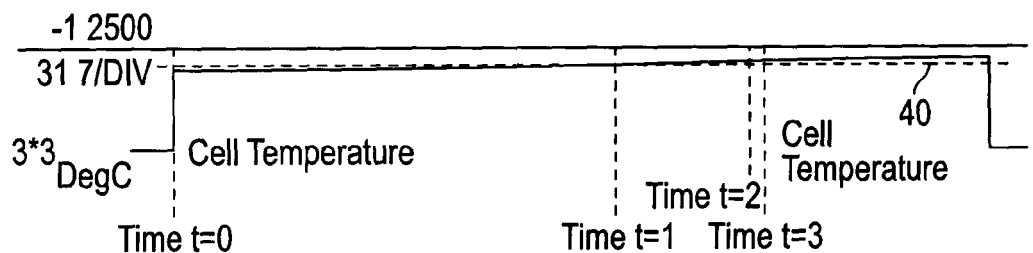
Figure 3D:
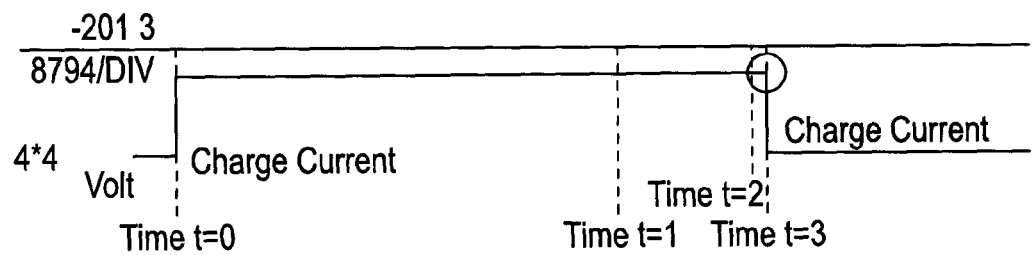

FIGS. 3a-3d are a series of graphs showing measured data from one example implementation of the present system where a battery is subjected to an overcharge condition, the overcharge condition is detected, and the charging current is shutdown. FIG. 3a is a graph of cell voltage within a battery exposed to an overcharge condition. FIG. 3b is a graph of air pressure within a sealed chamber holding a battery exposed to an overcharge condition. FIG. 3c is a graph of a component temperature within a battery exposed to an overcharge condition. FIG. 3d is a graph of charge current supplied to a battery exposed to an overcharge condition.

As shown in FIGS. 3a-3d, a charge current is applied to the battery at time t=0. In the present example, the charge current does not shutdown when the battery is fully charged. Instead, the charge current continues to be applied to the battery, resulting in an overcharge condition. As the charging current continues to be applied, FIGS. 3a and 3c show that each of the voltage, and temperature within the battery increases.

At time t=1, the temperature of one of the cells within the battery passes a predetermined temperature threshold 40. As such, one of the conditions for triggering the shutdown of the charging circuit has been met. At time t=2, the second threshold is met when, as the pressure within the battery increases, the battery casing fails venting inflammable gas or vapor into the testing chamber. As shown in FIG. 3b, at the time of venting, the air pressure within the chamber increases as the pressurized vapors are released from the battery into the chamber. The gas is detected by the organic sensor, resulting in the second condition for charge current shutdown being met.

At time t=3, after detecting that both the temperature condition and the organic gas sensor condition (i.e., inflammable gasses have been detected) have been fulfilled, the sensor controller initiates a shutdown of the charging process. As such, the potential flame condition that may result from the escalated temperatures and venting of inflammable gas due to the overcharge condition may be avoided. As shown in FIG. 3d, at time t=3, the charging current goes to zero after both conditions have been detected and the charging system is shutdown.

Figure 4:
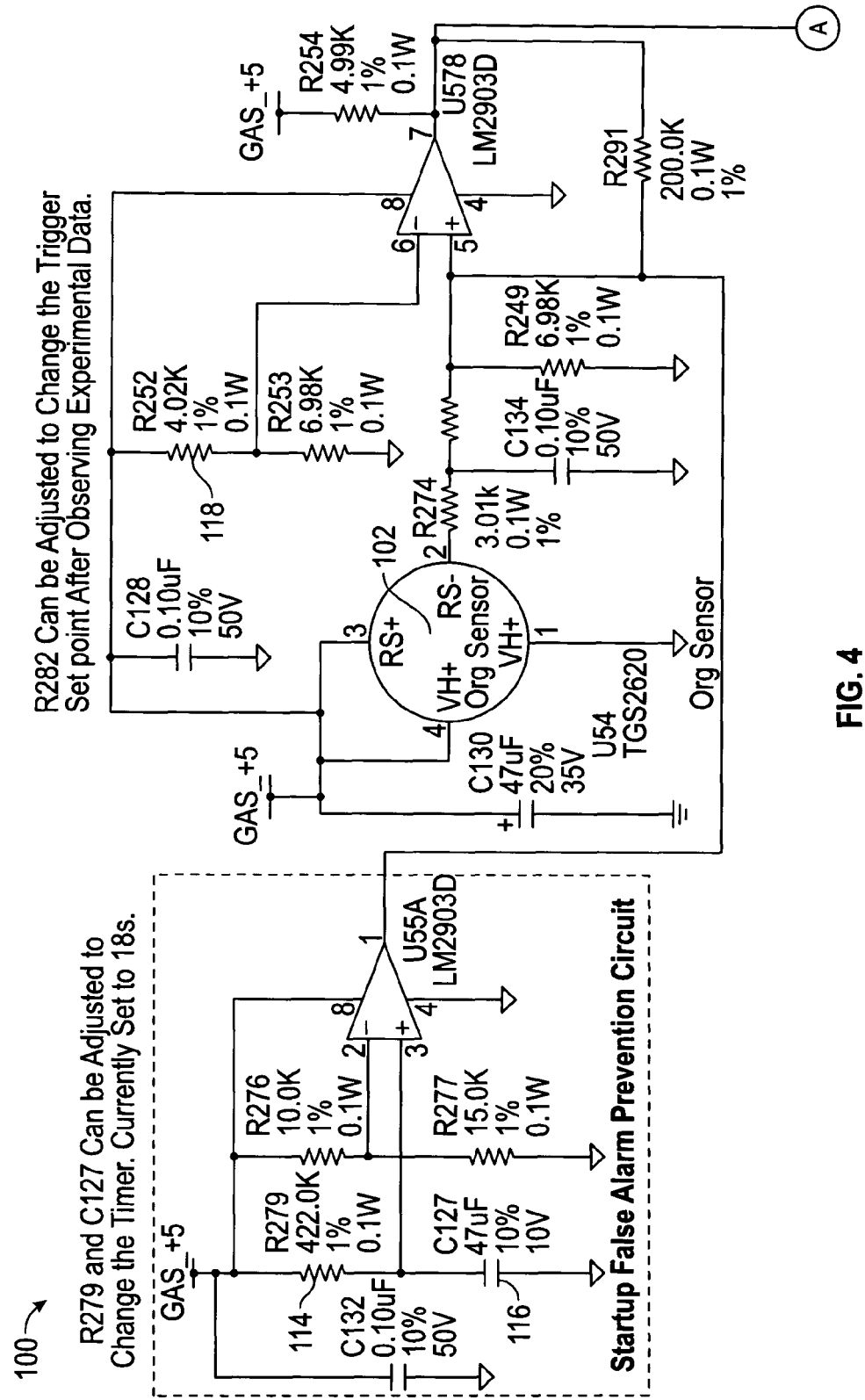
FIG. 4 is a schematic showing one possible electronic circuit implementation of the present sensor system including the gas sensor, temperature sensor and a delay circuit for preventing possible false alarms occurring upon sensor system start-up.
Figure 4:
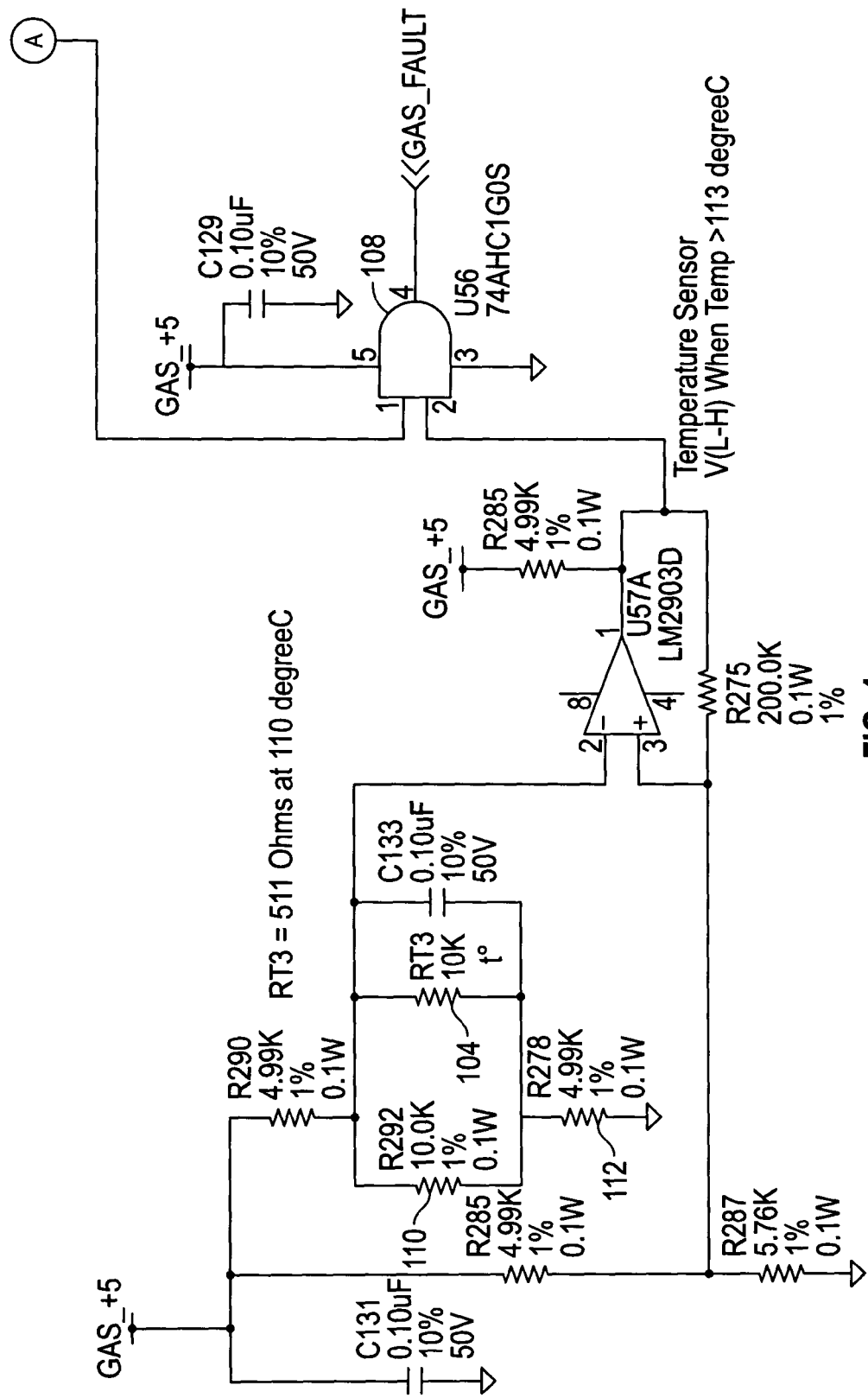

FIG. 4 is a schematic showing one possible implementation of the present sensor system including the organic gas sensor, temperature sensor and a delay circuit for preventing possible false alarms occurring upon sensor start-up. Sensor system 100 includes organic sensor 102 for detecting inflammable gasses that may be vented in the event of battery overcharge. Temperature sensor 104 may be coupled to one or more cells within the battery to detect an overcharge condition of the battery. In one specific implementation, however, temperature sensor 104 is coupled to one or more of the terminals of the battery.

In one implementation, temperature sensor 104 includes a thermistor configured to provide a resistance that varies with temperature. Delay timer circuit 106 may assist in preventing a possible false alarm that could occur upon initialization of the sensor system. For example, in one implementation, organic gas sensor 102 includes a surface heater that must reach operating temperature before organic gas sensor 102 can report accurate measurements. Without the delay circuit, the system may report false alarms before the heater of organic gas sensor 102 reaches operating temperature.

The pre-defined temperature trigger for temperature sensor 104 may be adjusted by modifying a value of resistors 110 and 112. As shown in FIG. 4, the pre-determined temperature may be set to 113 degrees Celsius, for example. The duration of delay timer circuit 106 may be adjusted by modifying the values of resistor 114 and capacitor 116. As shown in FIG. 4, the delay is set to 18 seconds, however other values may be used. In FIG. 4, the sensitivity of organic sensor 102 may be adjusted by modifying a value of 118, for example.

The signals received from organic sensor 102 and temperature sensor 104 are 'anded' together at AND-gate 108. Accordingly, if the pre-determined temperature is detected, and the organic sensor detects an inflammable gas, the circuit may supply a gas_fault signal to shutdown the battery charging process that may be causing overcharge and a potential flame condition.

While one or more embodiments of the present invention have been illustrated in detail, the skilled artisan will appreciate that modifications and adaptations to those embodiments may be made without departing from the scope of the present invention as set forth in the following claims.

What is claimed is:

1. A sensor system for mitigating a flame condition in a battery subject to an overcharge condition and being charged using a charging current, comprising:
   a. a temperature sensor configured to detect a temperature of at least one component of the battery;
   b. a gas sensor configured to detect, in the airspace close to the battery, at least one of an inflammable gas and an inflammable vapor; and
   c. a sensor control, the sensor control being configured to, when the temperature of the at least one component of the battery exceeds a predetermined temperature threshold and when the gas sensor detects at least one of an inflammable gas and an inflammable vapor, halt the charging current.

2. The sensor system of claim 1, including a delay circuit configured to delay an operation of the sensor system for a predetermined delay period.

3. The sensor system of claim 2, wherein the pre-determined delay period is greater than 15 seconds.

4. The sensor system of claim 1, wherein the gas sensor is configured to detect organic vapors.

5. The sensor system of claim 1, wherein the temperature sensor is configured to detect a temperature of a terminal of the battery.

6. The sensor system of claim 1, wherein the pre-determined temperature threshold is 110 degrees Celsius.

7. The sensor system of claim 1, wherein the temperature sensor includes a thermistor.

8. A method for mitigating a flame condition in a battery subject to an overcharge condition and being charged using a charging current, comprising:
   a. detecting a temperature of at least one component of the battery;
   b. detecting, in the airspace close to the battery, at least one of an inflammable gas and an inflammable vapor; and
   c. when the temperature of the at least one component of the battery exceeds a pre-determined temperature threshold and at least one of an inflammable gas and an inflammable vapor is detected, halting the charging current.

9. The method of claim 8, including delaying detection of at least one of an inflammable gas and an inflammable vapor by a predetermined delay period to compensate for a gas sensor start-up period.

10. The method of claim 9, wherein the pre-determined delay period is greater than 15 seconds.

11. The method of claim 8, wherein detecting at least one of an inflammable gas and an inflammable vapor includes detecting organic vapors.

12. The method of claim 8, wherein detecting a temperature of at least one component of the battery includes detecting a temperature of a terminal of the battery.

13. The method of claim 8, wherein the pre-determined temperature threshold is 110 degrees Celsius.

14. The method of claim 8, including using a thermistor for detecting a temperature of at least one component of the battery.

* * * * *